Feb. 5, 1929.  1,700,857
F. A. SCHULTZ
HEM GAUGE
Filed April 30, 1927
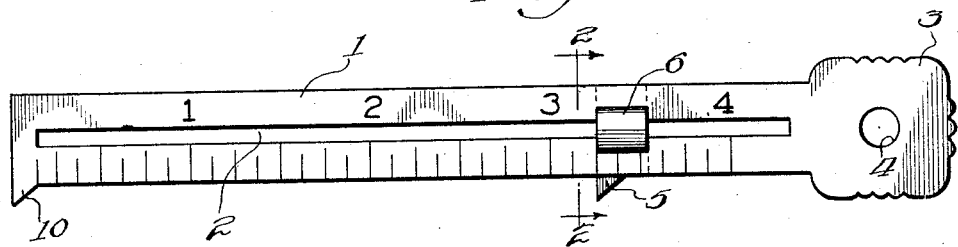
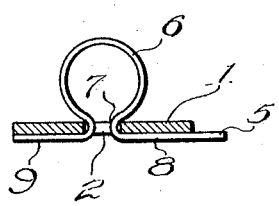 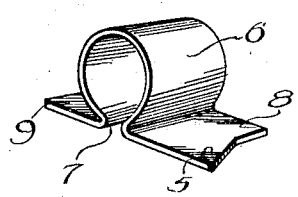
Witnesses.
Arthur M. Franke.
Wm Cyrus Rice
Inventor.
Frank A. Schultz.
BY Rummler & Rummler
Attys:

Patented Feb. 5, 1929.

1,700,857

UNITED STATES PATENT OFFICE.

FRANK A. SCHULTZ, OF CHICAGO, ILLINOIS, ASSIGNOR TO PELOUZE MANUFACTURING COMPANY, OF CHICAGO, ILLINOIS, A CORPORATION OF ILLINOIS.

HEM GAUGE.

Application filed April 30, 1927. Serial No. 187,875.

This invention relates to measuring devices particularly suited for use by all who sew.

The main objects of this invention are to provide an improved sheet metal measuring device or gauge having a graduated scale and an adjustable pointer slidably carried thereby; to provide an improved device adapted for use in the measurement of the width of hems, ruffles; measurement of distances between buttons, buttonholes, etc., and to provide an improved device of this character which is of simple construction, yet serviceable and cheap to manufacture.

An illustrative embodiment is shown in the accompanying drawings in which:

Figure 1 is a top plan view of the complete measuring gauge.

Fig. 2 is a sectional view thereof taken on line 2—2 of Fig. 1.

Fig. 3 is a perspective view of the adjustable pointer.

In the drawings is shown a sheet metal strip 1 having a narrow longitudinally disposed slot 2 therein. The portion of the strip 1 on one side of the slot 2 is graduated and the portion of the strip on the other side of said slot is numerically numbered, preferably in inches, in order that the user may definitely measure the width of hems, the distances between hooks and eyes, etc. One end of the strip 1 is widened to form a head 3 which is provided with an aperture 4 which may be used to hang the gauge on a hook or nail when not in use. The opposite end of the strip is extended transversely on the scale side to form a pointed finger 10, the tip end of which is flush with the end of the strip.

A pointer 5, comprising a strip of sheet metal having a head or loop portion 6, a relatively smaller neck portion 7 and a pair of oppositely extending laterally disposed members or arms 8 and 9, is slidably and frictionally embraced between the edges forming the slot 2. One edge of the member 8 projects beyond the outer edge of the graduated strip and forms a triangular shaped pointer 5 for indicating the distances measured.

The pointer may be inserted in the slot by springing the portions of the metal strip on each side of said slot apart and in opposite directions a distance sufficient to allow the loop part 6 to be slipped therebetween. This is facilitated by shaping the head so that its sides slope away from the neck.

It will be seen that the measuring gauge is very simple in construction, yet is serviceable and can be cheaply manufactured. The shape and material of the pointer is such that its contracted neck frictionally grips the side walls of the slot to prevent the pointer from slipping from a set position, yet its resiliency permits it to be easily slid to a new position by the user when desired.

While but one specific embodiment of this invention has been herein shown and described, it will be understood that details of the construction shown may be altered or omitted without departing from the spirit of this invention as defined by the following claims.

I claim:

1. In a device of the character described, an elongated strip having a longitudinally disposed slot therein, and a pointer for indicating the space between it and the end of said strip, said pointer comprising a head portion, a relatively smaller neck portion and a pair of oppositely extending laterally disposed members, said head portion being disposed on one side of the said strip, said members being disposed on the opposite side of said strip and said neck portion being slidably embraced between the edges forming said longitudinally disposed slot.

2. In a device of the character described, an elongated sheet metal strip having a transversely projecting pointed finger integral therewith and at one end thereof and a longitudinally disposed slot therein, and a transversely projecting sheet metal pointer comprising a looped head portion, a neck portion and a pair of oppositely extending laterally disposed arms, said neck portion being frictionally and slidably disposed within said slot, for measuring distances between said integral finger and said transversely projecting pointer.

3. In a device of the character described, an elongated resilient sheet metal measuring strip having a longitudinally disposed slot therein, and a pointer frictionally and slidably disposed in said slot comprising a resilient sheet metal strip bent to form a bowed head portion, a relatively smaller neck portion and a pair of oppositely extending laterally disposed arms.

Signed at Chicago this 26th day of April, 1927.

FRANK A. SCHULTZ.